United States Patent
Huang et al.

(10) Patent No.: US 11,516,681 B2
(45) Date of Patent: Nov. 29, 2022

(54) WIRELESS COMMUNICATION SYSTEM, RELAY COMMUNICATION DEVICE AND COMMUNICATION CONTROL METHOD

(71) Applicant: NIPPON TELEGRAPH AND TELEPHONE CORPORATION, Tokyo (JP)

(72) Inventors: Chunhsiang Huang, Musashino (JP); Tatsuya Fukui, Musashino (JP); Go Yazawa, Musashino (JP); Naoki Kita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 106 days.

(21) Appl. No.: 17/055,034

(22) PCT Filed: May 8, 2019

(86) PCT No.: PCT/JP2019/018413
§ 371 (c)(1),
(2) Date: Nov. 12, 2020

(87) PCT Pub. No.: WO2019/220984
PCT Pub. Date: Nov. 21, 2019

(65) Prior Publication Data
US 2021/0219149 A1    Jul. 15, 2021

(30) Foreign Application Priority Data

May 17, 2018 (JP) .............................. JP2018-095626

(51) Int. Cl.
*H04W 16/32* (2009.01)
*H04W 76/11* (2018.01)
(Continued)

(52) U.S. Cl.
CPC ....... *H04W 16/32* (2013.01); *H04W 72/0426* (2013.01); *H04W 76/11* (2018.02); *H04W 92/20* (2013.01); *H04W 88/16* (2013.01)

(58) Field of Classification Search
None
See application file for complete search history.

(56) References Cited

U.S. PATENT DOCUMENTS

2013/0223227 A1* 8/2013 Lee .................... H04B 7/15557
370/236
2016/0337924 A1* 11/2016 Ohta .......................... H04L 5/00

OTHER PUBLICATIONS

3GPP TS 36.300 version 13.9.0 Release 13, ETSI TS 136 300 V13.9.0, Oct. 2017, pp. 38-39, pp. 49-53, pp. 103-104.

* cited by examiner

*Primary Examiner* — Hong Shao

(57) ABSTRACT

SeNBs generate first identification information for specifying wireless access networks on the basis of system information provided in a notification from a relay communication device, wirelessly transmit the first identification information to UE, and notify an MeNB of second identification information for specifying wireless resources, utilization of which is permitted, via the relay communication device. The MeNB sets, in a signal directed to an SeNB selected from the SeNBs in the first identification information received from the UE, the first identification information of the SeNB, sets the second identification information of the selected SeNB in the signal directed to the UE, and transmits the signal to the relay communication device. The relay communication device transfers the signal received from the master base station to the SeNB in accordance with the first identification or the second identification informa- (Continued)

tion set in the signal. The SeNB wirelessly transmits the signal transferred from the relay communication device and directed to the UE.

10 Claims, 19 Drawing Sheets

(51) Int. Cl.
*H04W 72/04* (2009.01)
*H04W 92/20* (2009.01)
*H04W 88/16* (2009.01)

| SeNB NUMBER | RADIO CENTER FREQUENCY | BANDWIDTH NUMBER | ANTENNA NUMBER | FIRST SYSTEM INFORMATION THAT CORRESPONDING SeNB DISTRIBUTES TO UE | SECOND SYSTEM INFORMATION THAT CORRESPONDING SeNB DISTRIBUTES TO UE |
|---|---|---|---|---|---|
| 1 | f0 | BW1 | ANT1 | 0 | 11 |
| 2 | f0 | BW2 | ANT5 | 0 | 25 |
| 3 | f0 | BW1 | ANT6 | 0 | 16 |
| 4 | f1 | BW1 | ANT2 | 1 | 12 |
| ... | | | | | |

Fig. 9

| SeNB NUMBER | BEARER ID PERMITTED BY SeNB |
|---|---|
| 1 | 1003, 1005, 2111 ... |
| 2 | 1050, 1290, 2560 ... |
| 3 | 1112, 1834, 2111 ... |
| 4 | ... |
| ... | |

Fig. 14

| SeNB NUMBER | WAVELENGTH NUMBER | TIME SLOT NUMBER | FIRST SYSTEM INFORMATION THAT CORRESPONDING SeNB DISTRIBUTES TO UE | SECOND SYSTEM INFORMATION THAT CORRESPONDING SeNB DISTRIBUTES TO UE |
|---|---|---|---|---|
| 1 | W0 | T11 | 0 | 11 |
| 2 | W0 | T35 | 0 | 35 |
| 3 | W1 | T26 | 1 | 26 |
| ... | | | | |

Fig. 16

| SeNB NUMBER | CONNECTION PORT | VLAN TAG | FIRST SYSTEM INFORMATION THAT CORRESPONDING SeNB DISTRIBUTES TO UE | SECOND SYSTEM INFORMATION THAT CORRESPONDING SeNB DISTRIBUTES TO UE |
|---|---|---|---|---|
| 1 | P0 | 10 | 0 | 10 |
| 2 | P1 | 13 | 0 | 13 |
| 3 | P2 | 10 | 1 | 10 |
| ... | | | | |

Fig. 18

WIRELESS COMMUNICATION SYSTEM, RELAY COMMUNICATION DEVICE AND COMMUNICATION CONTROL METHOD

CROSS-REFERENCE TO RELATED APPLICATIONS

This application is a 371 U.S. National Phase of International Application No. PCT/JP2019/018413, filed on May 8, 2019, which claims priority to Japanese Application No. 2018-095626 filed on May 17, 2018. The entire disclosures of the above applications are incorporated herein by reference.

TECHNICAL FIELD

The present invention relates to a wireless communication system, a relay communication device, and a communication control method.

BACKGROUND ART

The standard specification 3rd Generation Partnership Project (3GPP) Long Term Evolution (LTE)-Advanced for a mobile wireless communication system defines a function of dual connectivity (DC) in which a user equipment (UE) is connected to two base stations and establishes simultaneous communication (see Non-Patent Literature 1, pp. 49-53, for example). The UE that is compatible with the DC function can simultaneously be connected to a plurality of cells formed by two physically separated evolved nodes B (eNBs). Therefore, an increase in bandwidth for downlink (which means data transmission from base stations to terminals) communication is enabled through carrier aggregation of a plurality of radio frequencies, and an increase in throughput can be expected.

Non-Patent Literature 1 defines two schemes for transferring downlink user data to UE in the DC. In the first scheme, a serving gateway (S-GW) of a core network divides user data to be distributed to a UE between a master base station (master eNBL: MeNB) and a secondary base station (secondary eNB: SeNB). In the second scheme, the S-GW transfers whole user data to the MeNB, and the MeNB divides the user data directed to the SeNB.

In a case in which the aforementioned second scheme is used, the MeNB can distribute the appropriate amount of downlink user data directed to the UE and transmitted using a wireless resource of the MeNB itself and the appropriate amount of downlink user data that is directed to the UE and that is to be wirelessly transmitted by the SeNB. Note that X2-IF is an interface that connects the eNBs.

FIG. 19 is a diagram illustrating an example of a network configuration of a wireless communication system that performs DC using an MeNB and a plurality of SeNBs. An MeNB 91 illustrated in the drawing is connected to a plurality of subordinate SeNBs 92-1 to 92-3 via X2-IFs 93-1 to 93-3, respectively. Typically, the MeNB 91 forms wide coverage 10 with a radio frequency of equal to or less than 2 GHz. Meanwhile, the SeNBs 92-1 to 92-3 form narrower coverage 20-1 to 20-3 than the MeNB 91, respectively, using frequencies (radio frequencies of equal to or greater than 3.5 GHz, for example) that are different from the frequency used by the MeNB 91.

In a case in which a UE 94 with a function of DC is located at a position at which the coverage 10 of the MeNB 91 and the coverage 20-3 of the SeNB 92-3 overlap with each other, the UE 94 can receive downlink user data using each of a wireless band of the MeNB 91 a wireless band of the SeNB 92-3.

As a condition to be met when the MeNB 91 and the SeNBs 92-1 to 92-3 communicate with each other via the X2-IFs 93-1 to 93-3, respectively, there is an assumption that mutually identifiable destinations (IP addresses, for example) are recognized in a transport network layer (TNL).

CITATION LIST

Non Patent Literature

Non-Patent Literature 1: 3GPP TS 36.300 version 13.9.0 Release 13, October 2017, pp. 38-39, pp. 49-53

SUMMARY OF THE INVENTION

Technical Problem

Non-Patent Literature 1 does not define a method in which the MeNB and the SeNBs recognize their mutual destinations in the TNL. As a typical method, a method of allocating destinations to the MeNB and the SeNB and setting the destinations in advance is conceivable. Also, pp. 38-39 of Non-Patent Literature 1 describes a network configuration that employs an X2 GW, and the network configuration is adapted such that a plurality of HeNBs and eNBs communicate with each other. Thus, setting destinations (combinations of IP addresses and Global eNB IDs) in the TNL to be the X2 GW and the eNBs in advance is conceivable.

As described above, the SeNBs typically have narrower coverage than the MeNB. Thus, it is necessary to place a large number of SeNBs in order to increase an area in which the DC is performed. However, if a network configuration between the MeNB and the SeNBs including the X2-IFs is changed due to addition or removal of SeNBs, it becomes necessary to reset destinations between the eNBs in the TNL. In a case in which a plurality of SeNBs are added before start of a temporary event in order to accommodate increased user traffic during a period of the event, and the added SeNBs are removed after the event ends, for example, it is necessary to change destination information in the MeNB and the SeNBs. It is inefficient to perform the change operation every time in terms of construction and running of the network.

Further, there may be a case in which a network operator that places and runs the MeNB differs from a network operator that places and runs the SeNBs. For example, the operator of the SeNBs may lend only wireless resources of the SeNBs to the operator of the MeNB and provides a wireless communication service to the UE by the method of DC. In this case, there is a problem that more operations are required to be adjusted for mutually sharing the destinations (network configuration) in the TNL between the different operators.

In view of the aforementioned circumstances, an object of the present disclosure is to provide a wireless communication system, a relay communication device, and a communication control method capable of reducing complexity of information change setting operations between a master base station and secondary base stations.

Means for Solving the Problem

According to an aspect of the present invention, a wireless communication system includes a master base station; one or more secondary base stations; and a relay communication device that relays communication between the master base station and the secondary base stations. The relay communication device includes a destination control unit that notifies the secondary base stations of system information used to generate first identification information for specifying wireless access networks that the secondary base stations use for wireless communication with a terminal, and a transfer path control unit that performs processing of notifying the master base station of second identification information for specifying wireless resources, utilization of which is permitted by the secondary base stations, and processing of transferring a signal received from the master base station to one of the secondary base stations in accordance with the first identification information or the second identification information set in the signal. Each of the secondary base stations includes a first identification information generation unit that generates the first identification information on the basis of the system information provided in the notification from the relay communication device, a second identification information notification unit that notifies the master base station of the second identification information of the wireless resources, the utilization of which is permitted, via the relay communication device, and a wireless access communication function unit that wirelessly transmits, to the terminal, a signal in which the first identification information is set and the signal transferred from the relay communication device and directed to the terminal. The master base station includes a transmission unit that selects one of the secondary base stations to communicate with the terminal among the secondary base stations in the first identification information wirelessly received from the terminal, sets the first identification information of the selected secondary base station in the signal directed to the secondary base station, transmits the signal to the relay communication device, sets the second identification information of the selected secondary base station in the signal directed to the terminal, and transmits the signal to the relay communication device.

According to an aspect of the present invention, the transfer path control unit compares the first identification information set in the signal received from the master base station with the first identification information generated using the system information, and in a case in which they are matched, the transfer path control unit transfers the signal to the secondary base station in accordance with the first identification information, in the aforementioned wireless communication system.

According to an aspect of the present invention, the destination control unit generates the system information of the secondary base stations on the basis of information used for communication between the relay communication device and the secondary base stations, in the aforementioned wireless communication system.

According to an aspect of the present invention, the relay communication device and the secondary base stations are connected wirelessly or via an optical fiber or a logical line, in the aforementioned wireless communication system.

According to an aspect of the present invention, the master base station receives information of quality of wireless connection to the secondary base stations in the first identification information from the terminal, in the aforementioned wireless communication system.

According to an aspect of the present invention, the first identification information includes information of service providers of the secondary base stations, in the aforementioned wireless communication system.

According to an aspect of the present invention, a relay communication device is in a wireless communication system that includes a master base station, one or more secondary base stations, and the relay communication device that relays communication between the master base station and the secondary base stations. The relay communication device includes a destination control unit that notifies the secondary base stations of system information used to generate first identification information for specifying wireless access networks that the secondary base stations use for wireless communication with a terminal; and a transfer path control unit that performs processing of notifying the master base station that performs wireless communication with the terminal of second identification information for specifying wireless resources, utilization of which is permitted by the secondary base stations, and processing of transferring a signal received from the master base station to one of the secondary base stations in accordance with the first identification information or the second identification information set in the signal.

According to an aspect of the present invention, there is provided a communication control method in a wireless communication system that includes a master base station, one or more secondary base stations, and a relay communication device that relays communication between the master base station and the secondary base stations. The method includes causing the relay communication device to notify the secondary base stations of system information used to generate first identification information for specifying wireless access networks that the secondary base stations use for wireless communication with a terminal; causing the secondary base stations to generate the first identification information on the basis of the system information provided in the notification from the relay communication device, wirelessly transmit a signal in which the first identification information is set to the terminal, and notify the master base station of second identification information for specifying wireless resources, utilization of which is permitted, via the relay communication device; causing the master base station to select one of the secondary base stations to communicate with the terminal among the secondary base stations in the first identification information wirelessly received from the terminal, set the first identification information of the selected secondary base station in the signal directed to the secondary base station, transmit the signal to the relay communication device, set the second identification information of the selected secondary base station in the signal directed to the terminal, and transmit the signal to the relay communication device; causing the relay communication device to transfer the signal received from the master base station to the secondary base station in accordance with the first identification or the second identification set in the signal; and causing the secondary base station to wirelessly transmit, to the terminal, the signal transferred from the relay communication device and directed to the terminal.

Effects of the Invention

According to the present disclosure, it is possible to reduce complexity of information change setting operations between the master base station and the secondary base stations.

BRIEF DESCRIPTION OF DRAWINGS

FIG. 9 is a diagram illustrating an example of a system information table that the relay communication device according to the embodiment stores.

FIG. 14 is a diagram illustrating an example of wireless resource information that a transfer path control unit holds according to the embodiment.

FIG. 16 is a diagram illustrating an example of a system information table that the relay communication device stores according to the embodiment.

FIG. 18 is a diagram illustrating an example of a system information table that the relay communication device stores according to the embodiment.

DESCRIPTION OF EMBODIMENTS

Hereinafter, embodiments of the present invention will be described in detail with reference to the drawings. In the embodiments, a wireless communication system performs dual connectivity (DC), and a master base station (MeNB) transfers a control signal and user data to a secondary base station (SeNB) as a target of the DC via a relay communication device even though the MeNB does not recognize the IP address of the SeNB in advance.

Description Regarding Relay Communication Device and SeNB

Figure 1:
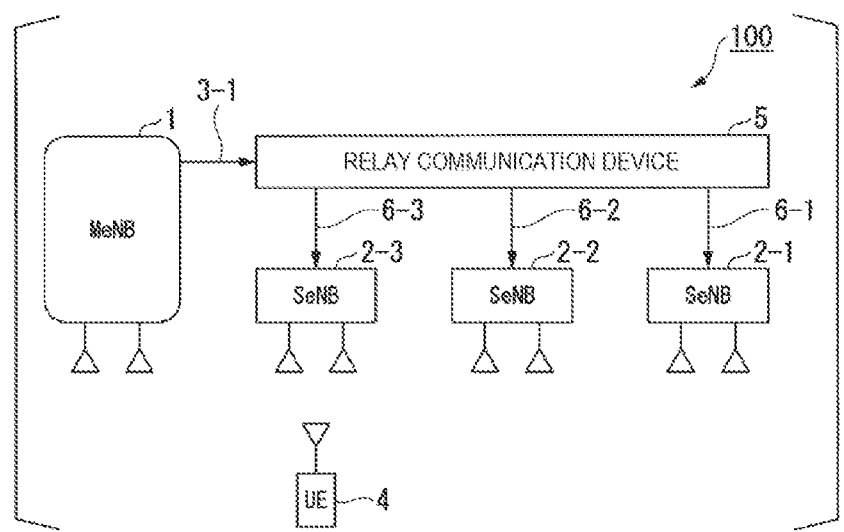
FIG. 1 is a diagram illustrating an example of a network configuration of a wireless communication system according to an embodiment.

FIG. 1 is a diagram illustrating an example of a network configuration of a wireless communication system 100 according to an embodiment. The wireless communication system 100 has a network configuration in which a relay communication device 5 is interposed between an MeNB 1 and N (N is an integer of equal to or greater than one) SeNBs 2. The drawing illustrates an example of a case in which N=3. The n-th (n is an integer from N to 1) SeNB 2 will be described as an SeNB 2-$n$. The MeNB 1 and the relay communication device 5 already know their destinations in the TNL each other.

Figure 19:
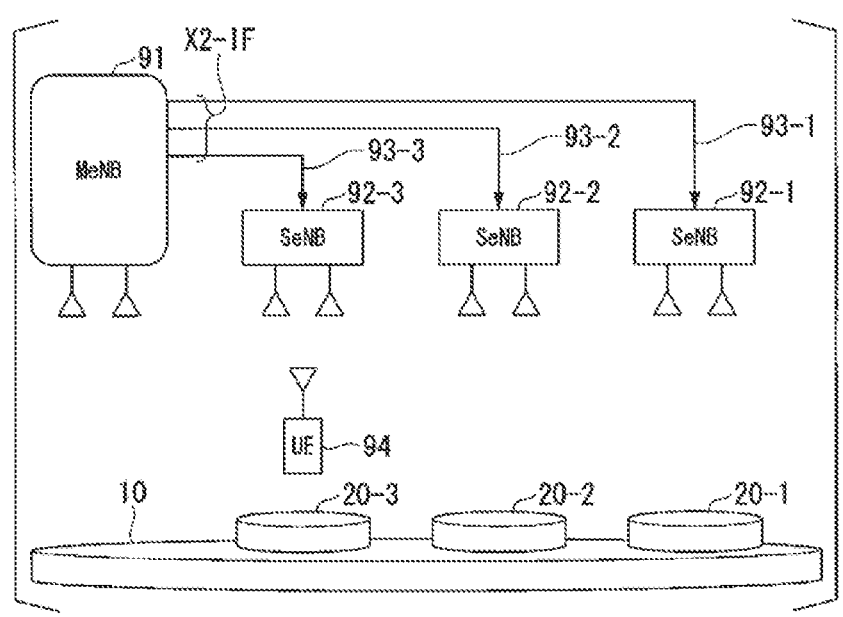
FIG. 19 is a diagram illustrating an example of a network configuration of a wireless communication system in the related art.

The relay communication device 5 receives and recognizes a control signal for performing the DC and downlink distributed user data from the MeNB 1, and transfers the control signal and the downlink user data to any of the SeNBs 2-1 to 2-N as a target of the DC. The relay communication device 5 is connected to the MeNB 1 via a link 3-1 and is connected to the SeNB 2-$n$ via a link 6-$n$. An X2-IF is used as the link 3-1. In order to perform the DC in the configuration illustrated in the drawing, the MeNB 1 transfers the downlink distributed user data to the SeNB 2-1 to 2-N in a cell in which a UD 4 is present via the relay communication device 5. Unlike the network configuration illustrated in FIG. 19, the MeNB 1 does not explicitly recognize destination information of the SeNBs 2-1 to 2-N in the TNL.

Figure 2:
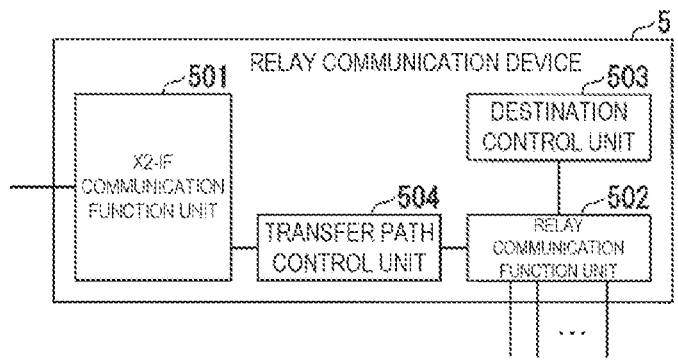
FIG. 2 is a block diagram illustrating a configuration example of a relay communication device according to the embodiment.

FIG. 2 is an example of a block diagram illustrating a configuration of the relay communication device 5 and illustrates only extracted functional blocks that relate to the embodiment. The relay communication device 5 includes an X2-IF communication function unit 501, a relay communication function unit 502, a destination control unit 503, and a transfer path control unit 504. The relay communication device 5 is connected to the MeNB 1 with the X2-IF communication function unit 501 and is connected to the SeNBs 2 with the relay communication function unit 502. The destination control unit 503 establishes communication with the SeNBs 2 and then determines identification information that the SeNBs 2 are to transmit to the subordinate UE 4.

The relay communication device 5 transfers the control signal received from the MeNB 1 and the downlink distributed user data to an appropriate SeNB 2. Thus, the transfer path control unit 504 has a function of comparing the identification information of the SeNBs 2 set in the control signal received from the MeNB 1 and controlling a transfer path of the control signal and the downlink user data.

Figure 3:
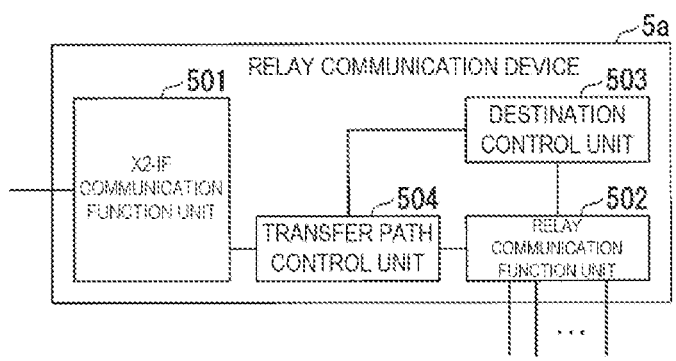
FIG. 3 is a block diagram illustrating a configuration example of the relay communication device according to the embodiment.
Figure 4:
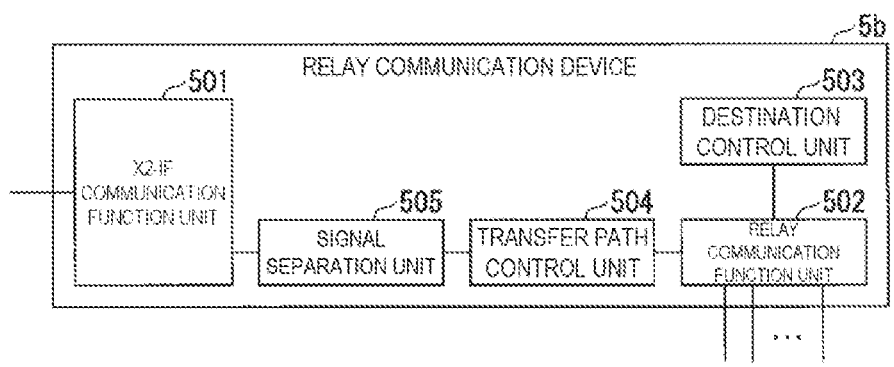
FIG. 4 is a block diagram illustrating a configuration example of the relay communication device according to the embodiment.

Note that in regard to the relay communication device 5 illustrated in FIG. 2, a relay communication device 5$a$ with a configuration illustrated in FIG. 3 or a relay communication device 5$b$ illustrated in FIG. 4 can also be used instead of the relay communication device 5.

FIG. 3 is an example of a block diagram illustrating a configuration of the relay communication device 5$a$ and illustrates only extracted functional blocks that relate to the embodiment. The relay communication device 5$a$ illustrated in the drawing is different from the relay communication device 5 illustrated in FIG. 2 in that the destination control unit 503 and the transfer path control unit 504 transmit and receive data directly. The transfer path control unit 504 receives and saves information set by the destination control unit 503.

FIG. 4 is an example of a block diagram illustrating a configuration of the relay communication device 5$b$ and illustrates extracted functional blocks that relate to the embodiment. The relay communication device 5$b$ illustrated in the drawing is different from the relay communication device 5 illustrated in FIG. 2 in that a signal separation unit 505 is included between the X2-IF communication function unit 501 and the transfer path control unit 504. The signal separation unit 505 separates a control signal and a data signal received from the MeNB 1 and outputs the control signal and the data signal to the transfer path control unit 504 in a later stage. In this manner, the relay communication device 5b separates the control signal and the data signal, and performs destination control and transfer path control on these separated signals. Note that the relay communication device 5b may have a configuration in which the signal separation unit 505 is included between the X2-IF communication function unit 501 and the transfer path control unit 504 in the relay communication device 5a illustrated in FIG. 3.

Figure 5:
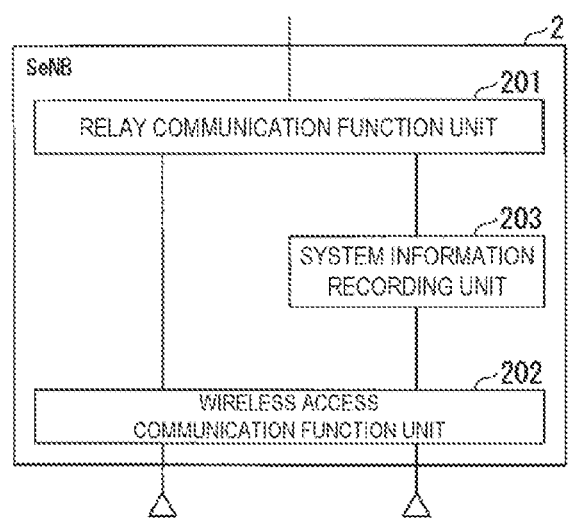
FIG. 5 is a block diagram illustrating a configuration example of an SeNB according to the embodiment.

FIG. 5 is an example of a block diagram illustrating a configuration of each SeNB 2 and illustrates only extracted functional blocks that relate to the embodiment. Each SeNB 2 includes a relay communication function unit 201, a wireless access communication function unit 202, and a system information recording unit 203. The SeNB 2 is connected to the relay communication device 5 with the relay communication function unit 201 and is connected to the subordinate UE 4 with the wireless access communication function unit 202. The system information recording unit 203 records identification information of a wireless access network that the wireless access communication function unit 202 uses to communicate with the UE 4. The wireless access communication function unit 202 has a function of producing system information (for example, Systeminformationblocktype message in an RRC layer, a synchronization signal in a PHY layer, or the like) to be transmitted to the UE 4 in accordance with the identification information recorded in the system information recording unit 203.

Figure 6:
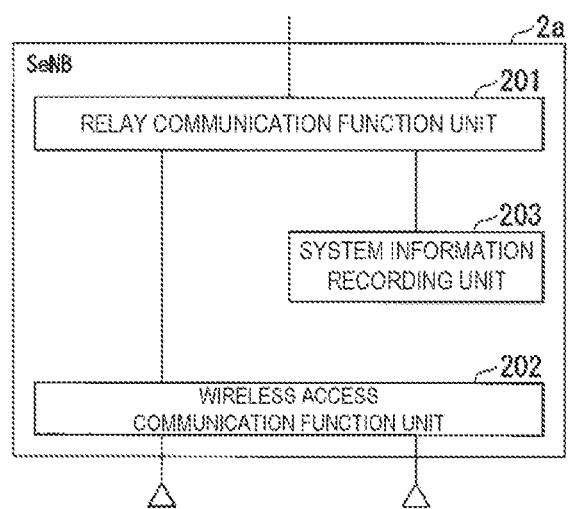
FIG. 6 is a block diagram illustrating a configuration example of the SeNB according to the embodiment.
Figure 7:
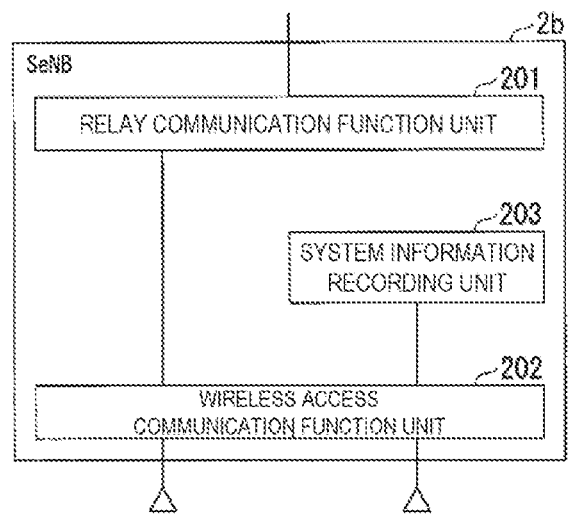
FIG. 7 is a block diagram illustrating a configuration example of the SeNB according to the embodiment.

Note that instead of the SeNB 2 illustrated in FIG. 5, an SeNB 2a with a configuration illustrated in FIG. 6 or an SeNB 2b illustrated in FIG. 7 can also be used. FIG. 6 is an example of a block diagram illustrating a configuration of the SeNB 2a and illustrates only extracted functional blocks that relate to the embodiment. The SeNB 2a illustrated in the drawing is different from the SeNB 2 illustrated in FIG. 5 in that the wireless access communication function unit 202 is not connected to the system information recording unit 203. The wireless access communication function unit 202 transmits and receives data to and from the system information recording unit 203 via the relay communication function unit 201.

FIG. 7 is an example of a block diagram illustrating a configuration of the SeNB 2b and illustrates only extracted functional blocks that relate to the embodiment. The SeNB 2b illustrated in the drawing is different from the SeNB 2 illustrated in FIG. 5 in that the relay communication function unit 201 is not connected to the system information recording unit 203. The relay communication function unit 201 transmits and receives data to and from the system information recording unit 203 via the wireless access communication function unit 202.

In FIG. 1, connection between the relay communication device 5 and the SeNBs 2-1 to 2-N is illustrated as links 6-1 to 6-N. The links 6-1 to 6-N are not necessarily physically independent communication paths, but are required to have a distinguishable connection relationship between the relay communication device 5 and each of the SeNBs 2. Connection schemes of the links 6-1 to 6-N may be either wired connection or wireless connection. The links 6-1 to 6-N may employ connection schemes of dedicated lines or may employ connection schemes of a shared line (for example, multiple-access connection using radio frequencies or light wavelengths).

The UE 4 illustrated in FIG. 1 is a terminal device that has a DC communication function. The UE 4 is assumed to be in a state in which connection has been established (RRC-_CONNECTED) with a cell of the MeNB 1 in a radio resource control (RRC) layer. The UE 4 can receive radio waves from the cells of the SeNBs 2-1 to 2-N and can constantly measure quality of wireless access communication with each of the SeNBs 2-1 to 2-N. The UE 4 can report the measured quality to the MeNB 1 using an RRC message such as MeasurementReport.

First Embodiment

In a first embodiment, link connection between the relay communication device 5 and each SeNB 2 is wireless connection.

Figure 8:
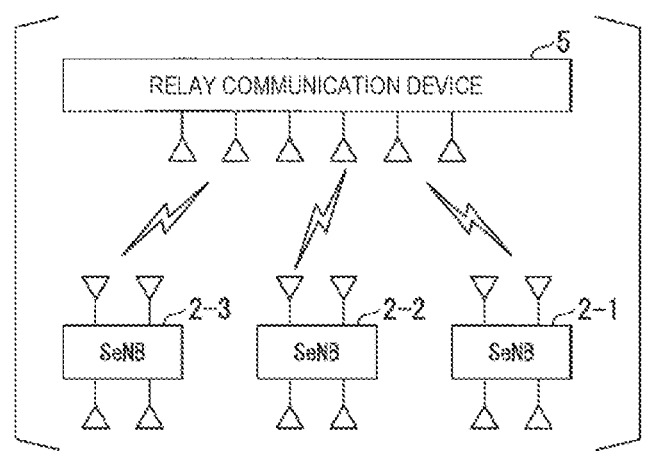
FIG. 8 is a diagram illustrating an example of connection between the relay communication device and the SeNB according to the first embodiment.

FIG. 8 is a diagram illustrating an example of connection between the relay communication device 5 and a plurality of SeNBs 2 according to the embodiment. As illustrated in the drawing, the links 6-1 to 6-N between the relay communication device 5 and the SeNBs 2-1 to 2-N (N=3 in the drawing) are communication paths of a wireless communication scheme. The relay communication device 5 illustrated in the drawing is provided with an interface for performing wireless communication with a plurality of SeNBs 2 in a relay section of the links 6-1 to 6-N, such as a high-frequency circuit, an antenna, and the like for performing wireless communication, in addition to the configuration illustrated in FIG. 2, 3, or 4. The SeNBs 2-1 to 2-N are provided with interfaces for performing similar wireless communication with the relay communication device 5 in addition to the configuration of the SeNB 2b illustrated in FIG. 5, 6, or 7.

FIG. 9 is a diagram illustrating an example of a system information table stored in the destination control unit 503 of the relay communication device 5. The system information table includes data that associates SeNB numbers of the SeNBs 2, communication information indicating statuses of wireless connection to the SeNBs 2, and system information allocated to the SeNBs 2. The SeNB numbers are information for individually identifying the SeNBs 2. The statuses of wireless connection include information of radio center frequencies, bandwidth numbers, and antenna numbers. The system information is individual information for each SeNB 2. The system information includes first system information and second system information that the SeNBs 2 distribute to the UE 4.

The relay communication function unit 502 of the relay communication device 5 recognizes connection statuses in relay sections of the links 6-1 to 6-N to the SeNBs 2-1 to 2-N. The relay communication device 5 wirelessly communicates with SeNBs 2 newly added to the relay communication function unit 502. Thus, the relay communication function unit 502 shares communication information of at least a part of radio center frequencies, bandwidth numbers, antenna numbers, and the like as illustrated in the example in FIG. 9 with the SeNBs 2 and gets agreement for connection for communication. Here, a method for agreeing to connection for communication is not specifically designated, and any arbitrary method may be used. However, the relay communication device 5 is adapted to be able to detect results of connection for communication with the SeNBs 2 and perform necessary control on the SeNBs 2. A method in which the relay communication device 5 controls the SeNBs 2 will be described below.

The destination control unit 503 of the relay communication device 5 acquires information (communication information) regarding connection for communication with a new SeNB 2 from the relay communication function unit 502. The destination control unit 503 uses the acquired communication information to set system information that the new SeNB 2 uses when the new SeNB 2 communicates with the UE 4 via a wireless access network such that the system information does not overlap with that of any other SeNB 2. The destination control unit 503 associates and adds the SeNB numbers of the new SeNB 2, the communication information, and the system information in a system information table (FIG. 9). The destination control unit 503 distributes the system information set for the new SeNB 2 to the new SeNB 2 via the relay communication function unit 502.

The relay communication function unit 502 or the destination control unit 503 of the relay communication device 5 obtains a PLMN-ID that is identification information of network service providers to which the the new SeNB 2 belongs after the connection for communication with the new SeNB 2 and saves the PLMN-ID in the transfer path control unit 504. The relay communication function unit 502 or the destination control unit 503 also saves system information set so as to be used by the new SeNB 2 in the transfer path control unit 504.

Figure 10:
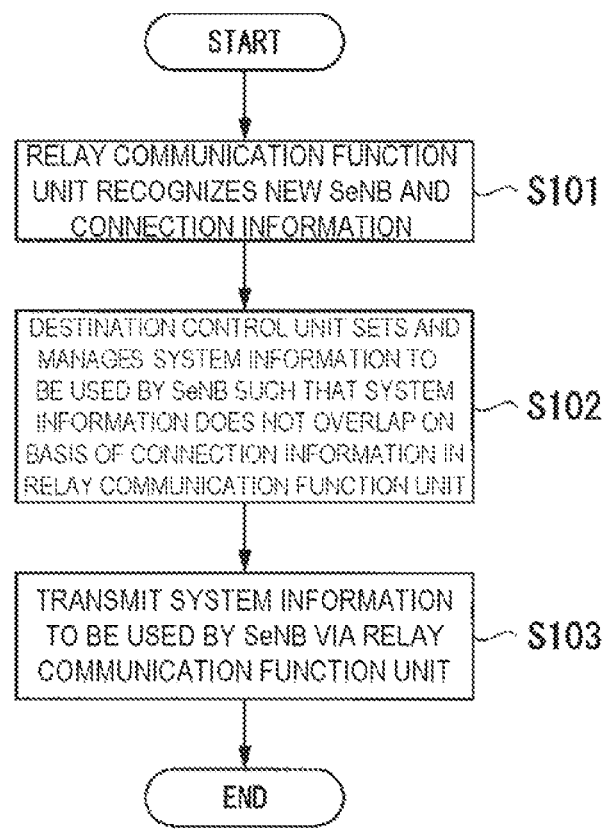
FIG. 10 is a flowchart illustrating an example of a system information setting procedure of the relay communication device according to the embodiment.

FIG. 10 is a flowchart illustrating an example of a procedure in which the relay communication device 5 sets the system information to be used by a newly connected SeNB 2.

The relay communication function unit 502 of the relay communication device 5 recognizes information of connection to a newly connected SeNB 2 (Step S101). The destination control unit 503 saves communication information such as radio center frequencies, bandwidth numbers, and antenna numbers in the system information table as illustrated in FIG. 9, for example, and further sets system information to be used by the SeNB 2. The destination control unit 503 sets the system information to be used by the SeNB 2 such that the system information does not overlap with that of different SeNBs 2, on the basis of the connection information recognized by the relay communication function unit 502 (Step S102).

In a case in which an SeNB 2 with an SeNB number 4 is added as illustrated in the example in FIG. 9, for example, the destination control unit 503 sets first system information that the SeNB 2 is to distribute to the UE 4 to 1 on the basis of a center frequency f1 Hz used for connection to the SeNB 2. In other words, the destination control unit 503 sets the first system information to i at the time of the center frequency fi. Because the bandwidth number for the connection to the SeNB 2 is BW 1, and the antenna number is ANT2, the destination control unit 503 then sets second system information that the SeNB 2 is to distribute to the UE 4 to 12 on the basis of the bandwidth number and the antenna number. In other words, when the bandwidth number is BWj, and the antenna number is ANTk, the destination control unit 503 sets the second system information to jk. In this manner, the destination control unit 503 sets system information configured of the first system information and the second system information such that the system information does not overlap with that of any other SeNB 2, and distributes the system information to the SeNB 2 via the relay communication function unit 502 (Step S103).

The procedure is not limited to the aforementioned procedure, and if there is a method for setting or managing system information such that the system information does not overlap with that of different SeNBs 2, such a method may be used. Also, the method for setting the system information for the SeNBs 2 using the radio frequencies, the bandwidths, and the antenna numbers has been described above. In addition, if there is information which allows the relay communication device 5 to uniquely identify each SeNB 2 on a wireless physical line, such information may be used. For example, such information includes time slots, coding types, transmission power, and the like used at the time of communication.

Method for Setting Identification Information for Wireless Access Network in SeNB 2

Figure 11:
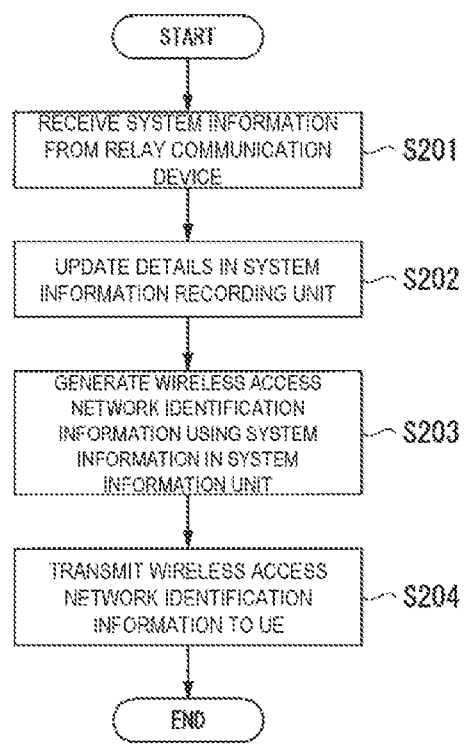
FIG. 11 is a flowchart illustrating an example of operations after the SeNB receives system information according to the embodiment.

FIG. 11 is a flow chart illustrating an example of operations after a new SeNB 2 receives the aforementioned system information from the relay communication device 5. After the SeNB 2 receives the system information from the relay communication device 5 (Step S201), the SeNB 2 updates the first system information and the second system information held by the system information recording unit 203 with the received system information (Step S202). Thereafter, the system information recording unit 203 generates identification information regarding a wireless access network to be transmitted to the UE 4 using the updated first system information and second system information (Step S203). When the wireless access communication function unit 202 performs wireless transmission to the UE 4, the wireless access communication function unit 202 sets the identification information generated in Step S203 (Step S204).

As the identification information regarding the wireless access network that the SeNB 2 transmits to the UE 4, there are synchronization signals, which are Primary synchronization signals and Secondary synchronization signals in a PHY layer of an eNB defined by a standard specification (see Citation Literature 1 "3GPP TS 36.211 version 12.8.0 Release 12, January 2016". p.p. 111 to 114). At most 504 types of combinations of non-overlapping synchronization signals are selectable for the eNB by combining 3 types of Primary synchronization signals and 168 types of Secondary synchronization signals.

In Step S203, the system information recording unit 203 of the SeNB 2 uses the first system information and the second system information included in the system information received from the relay communication device 5 to link the Primary synchronization signal to the Secondary synchronization signal and generate a combination of non-overlapping synchronization signals. For example, because the first system information used by the SeNB 2 with the SeNB number 4 illustrated in FIG. 9 is 1, the wireless access communication function unit 202 transmits the first Primary synchronization signal to the UE 4 in Step S204. Also, because the second system information is 12, the wireless access communication function unit 202 transmits the 12th Secondary synchronization signal to the UE 4 in Step S204.

In addition to the processing described above, the SeNB 2 further transmits other identification information regarding the wireless access network to the UE 4 via the wireless access communication function unit 202. Citation Literature 2 "3GPP TS 36.331 version 13.5.0 Release 13, April 2017", p. 263 describes SystemInformationblocktype1 Message in an RRC layer. PLMN-IDentityLIst of SystemInformationBlockType1 Message describes identification information PLMN-ID for determining which service provider the SeNB 2 belongs to. The identification information PLMN-ID is allocated to the service provider in a non-overlapping manner. The UE 4 can determine which service provider owns the SeNB 2 corresponding to received wireless access network information, with reference to the identification information PLMN-ID.

Description of Operation in Which UE 4 Reports Information Regarding Wireless Access Network of SeNB 2 to MeNB 1

The UE 4 is capable of measuring quality of wireless access communication with the SeNB 2 using the synchronization signals Primary Synchronization signal and Secondary synchronization signal received from the SeNB 2 to calculate a physical layer cell ID linked to the combination. The UE 4 reports the information regarding quality of wireless access communication with each SeNB 2 to the MeNB 1 by setting the result of measuring the quality of wireless access communication with the SeNB 2 in MeasResults of a Measurement Report Message in the RRC layer as described in Citation Literature 2, p. 148 to 151. Specifically, the UE 4 describes the PLMN-ID of the SeNB 2 in PLMN-IDentityList of MeasResults and describes the physical layer cell ID in PhysCellId of MassResults.

Description of Operation in Which Relay Communication Device 5 Reports Wireless Resource of Wireless Access Network to MeNB 1

The relay communication device 5 establishes connection to a new SeNB 2, transmits the first system information and the second system information to the target SeNB 2 as in Step S103 described above, and then reports, to the MeNB 1, that a resource of the wireless access network is to be added.

As an example of a report method, there is a method described in Citation Literature 3 "3GPP TS 36.423 version 13.7.0 Release 13, August 2017", pp. 27, 64, 107-109. In this manner, the transfer path control unit 504 of the relay communication device 5 sets a PLMN-ID related to the added SeNB 2 in the IE of Global eNB ID of X2 SETUP REQUEST Message, sets the physical layer cell ID of the SeNB 2 in the IE of PCI, and provides a report thereof to the MeNB 1.

The MeNB 1 can determine that the resource of the wireless access network has been added through the connection to the new SeNB 2 on the basis of such a report from the relay communication device 5. Even though a plurality of relay communication devices 5 are connected at the same time, the MeNB 1 can determine which wireless resource is present in each relay communication device 5.

In a case in which a subordinate SeNB 2 has been removed from the relay communication device 5, the relay communication device 5 can delete the removed SeNB 2 and the system information allocated to the removed SeNB 2 from the management table illustrated in FIG. 9 and can notify the MeNB 1 of a change in wireless resources as described in Citation Literature 3, pp. 30-31, 66-69.

Description of Method for Communication between MeNB 1 and Relay Communication Device 5

The MeNB 1 illustrated in FIG. 1 receives the information regarding quality of wireless access communication with each of a plurality of SeNBs 2 from the UE 4 and then selects SeNBs 2 to perform DC. The MeNB 1 makes this selection in accordance with information of the wireless resource in the wireless access network received from the relay communication device 5 and the amount of downlink user data required to be transferred to the UE 4. The MeNB 1 secures the wireless resource of the selected SeNB 2 via the relay communication device 5. A sequence example of this communication procedure will be illustrated in FIG. 12.

Identification and Transfer of Control Signal Performed by Relay Communication Device 5

Figure 12:
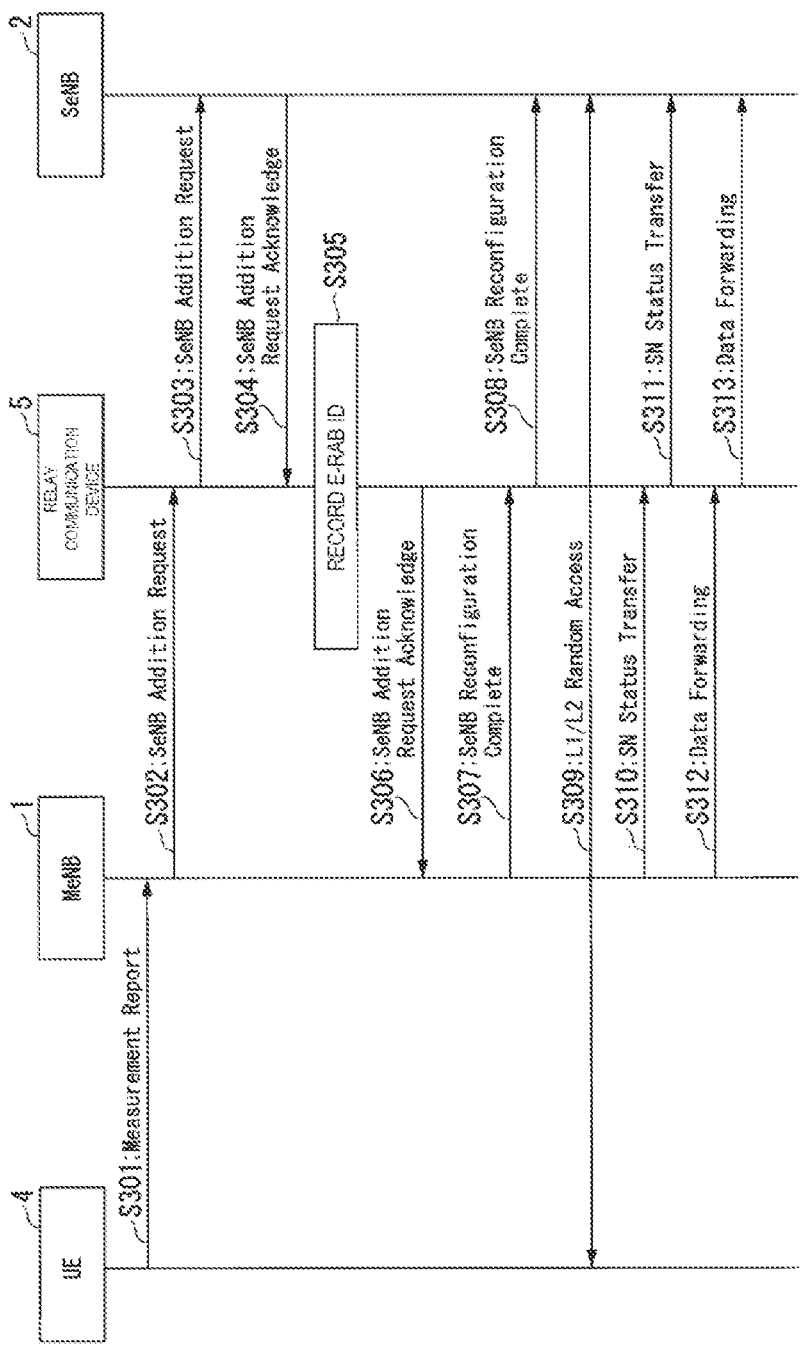
FIG. 12 is a sequence diagram illustrating an example of a procedure for communication between an MeNB and the relay communication device according to the embodiment.

FIG. 12 is a sequence diagram illustrating an example of a procedure for communication between the MeNB 1 and the relay communication device 5. The UE 4 delivers wireless reception and measurement results from each of the SeNBs 2 to the MeNB 1 using a MeasurementReport Message (Step S301). The UE 4 also sets information of the PLMN-ID of the SeNB 2 and the physical layer cell ID in the MeasurementReport Message. The MeNB 1 transmits an SeNB Addition Request Message directed to the SeNB 2 that may be a target of DC to the relay communication device 5 as described in Non-Patent Literature 1, pp. 103-104 (Step S302). Details of SeNB Addition Request Message are as described in Citation Literature 3, p. 83 and Citation Literature 2, pp. 571-574. The MeNB 1 sets the information of the PLMN-ID and the physical layer cell ID in SeNB Addition Request Message.

The transfer path control unit 504 of the relay communication device 5 receives the SeNB Addition Request Message transmitted from the MeNB 1 in Step S302 and then performs path control processing for transferring the received Message to the destination SeNB 2. The transfer path control unit 504 extracts information for controlling the path from the signal received from the MeNB 1 and transfers the received signal to the SeNB 2 on the basis of the extracted information.

Figure 13:
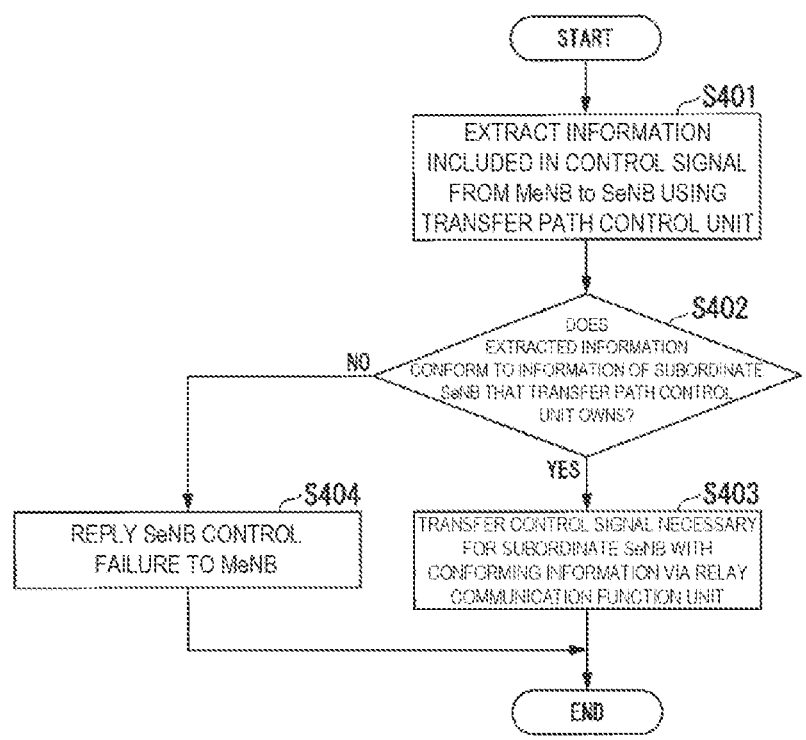
FIG. 13 is a flowchart illustrating path control processing of the relay communication device according to the embodiment.

FIG. 13 is a flowchart illustrating path control processing performed by the transfer path control unit 504 of the relay communication device 5. First, the transfer path control unit 504 extracts information of the PLMN-ID and the PhysCellId included in SCG-ConfigInfo, from the SeNB Addition Request Message input from the X2-IF communication function unit 501 (Step S401). In PhysCellId, the physical layer cell ID set by the MeNB 1 is described. The transfer path control unit 504 checks whether or not information with the same PLMN-ID as the extracted PLMN-ID is owned in the function unit of itself. In a case in which the information with the same PLMN-ID is determined to be owned, the transfer path control unit 504 calculates the PhysCellId by a method that is similar to that of the UE 4 using the first system information and the second system information and checks whether or not the PhysCellId conforms to extracted PhysCellId (Step S402).

The transfer path control unit 504 owns PLMN-ID extracted in Step S401, and in a case in which it is determined that the calculated PhysCellId is determined to conform to the extracted PhysCellId (Step S402: YES), the transfer path control unit 504 determines that the SeNB 2 with information that conforms to the extracted information is present as a subordinate SeNB 2 of the relay communication device 5. The transfer path control unit 504 transfers the SeNB Addition Request Message to the SeNB 2 corresponding to the extracted information (the PLMN-ID and the PhysCellId) via the relay communication function unit 502 (Step S403 in FIG. 13 and Step S303 in FIG. 12).

Note that in a case in which the transfer path control unit 504 determines that PLMN-ID extracted in Step S402 is not owned or that calculated PhysCellId does not conform to the extracted PhysCellId (Step S402: No), the transfer path control unit 504 determines that the SeNB 2 to be transferred is not present as a subordinate SeNB 2. In this case, the transfer path control unit 504 generates an SeNB Addition Request Reject Message that is a response indicating a control failure and transmits the SeNB Addition Request Reject Message to the MeNB 1 (Step S404).

The wireless access communication function unit 202 of the SeNB 2 that has received the SeNB Addition Request Message transferred by the relay communication device 5 in Step S303 in FIG. 12 determines whether or not it is possible to provide a wireless resource requested by the MeNB 1 after the reception of the Message. In a case in which the wireless access communication function unit 202 of the SeNB 2 determines that the wireless resource is providable, the wireless access communication function unit 202 transmits an SeNB Addition Request Acknowledge Message to the relay communication device 5 via the relay communication function unit 201 and notifies the MeNB 1 of permission (Step S304). The SeNB Addition Request Acknowledge Message has an E-RAB ID set as information representing the wireless resource permitted to use. E-RAB ID is information for specifying a wireless access bearer (E-RAB).

The transfer path control unit 504 of the relay communication device 5 receives the SeNB Addition Request Acknowledge Message from the SeNB 2 and then reads the permitted E-RAB ID from Message. The transfer path control unit 504 links and records the SeNB number and read E-RAB ID (Step S305).

FIG. 14 is a diagram illustrating an example of wireless resource information held by the transfer path control unit 504. As illustrated in the drawing, the wireless resource information is a table in which SeNB numbers and bearer IDs permitted by the SeNBs 2 of the SeNB numbers are linked to each other. E-RAB IDs are set as the bearer IDs in the wireless resource information.

As illustrated in FIG. 12, the transfer path control unit 504 transfers the SeNB Addition Request Acknowledge Message received from the SeNB 2 to the MeNB 1 after recording E-RAB ID (Step S306). The MeNB 1 performs RRC Connection Reconfiguration on the subordinate UE 4 in accordance with details of the SeNB Addition Request Acknowledge Message received from the relay communication device 5 and causes the UE 4 to add the wireless resource available for the SeNB 2. After the UE 4 completes the addition of the wireless resource, the MeNB 1 transmits an SeNB Reconfiguration Complete Message to the relay communication device 5 (Step S307).

The relay communication device 5 transfers the SeNB Reconfiguration Complete Message to the target SeNB 2 by the method illustrated in FIG. 13 in a manner similar to that described above (Step S308). The SeNB 2 that performs DC receives the SeNB Reconfiguration Complete Message and then carries out a procedure of L1/L2 Random Access in a section of wireless access communication as defined by the standard specification with the UE 4 that performs DC (Step S309). Once this procedure is completed, the SeNB 2 that is a target of DC can communicate with the UE 4.

Note that other control signals are also present to perform DC. In a case in which other information of PLMN-ID and SCG-ConfigInfo is included in other control signals, it is possible to add and change wireless resources in the UE 4 by a procedure that is similar to that described above.

After the aforementioned procedure in Step S301 to S309 is executed, the MeNB 1 transmits an SN Status Transfer Message, and the relay communication device 5 receives it (Step S310). The SN Status Transfer Message includes E-RAB ID permitted by the SeNB 2 from the MeNB 1. The transfer path control unit 504 of the relay communication device 5 recognizes the E-RAB ID in the SN Status Transfer Message and transfers the E-RAB ID to the SeNB 2 linked thereto in Step S305 (Step S311).

Identification and Transfer of User Data Performed by Relay Communication Device The MeNB 1 divides the downlink user data directed to the UE 4 to user data to be transmitted from the MeNB 1 itself and user data to be transmitted from the SeNB 2. The MeNB 1 sets the E-RAB ID in the user data to be transmitted from the SeNB 2 and transmits the user data to the relay communication device 5. If the relay communication device 5 receives the downlink user data from the MeNB 1, the transfer path control unit 504 checks the E-RAB ID included in a header of the user data and transfers the user data to the target SeNB 2 that performs DC similarly to the Sn Status Transfer Message described above (Steps S312 to S313). The SeNB 2 transmits the downlink user data transferred from the relay communication device 5 to the UE 4 using the wireless resource of the E-RAB ID. On the other hand, the MeNB 1 wirelessly transmits the downlink user data to be transmitted from the MeNB 1 itself to the UE 4.

Second Embodiment

Figure 15:
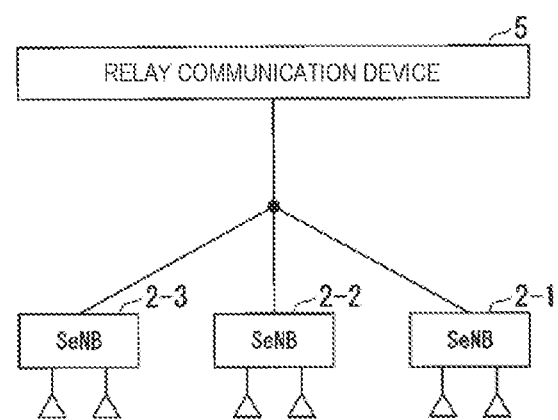
FIG. 15 is a diagram illustrating an example of connection between a relay communication device and an SeNB according to a second embodiment.

A second embodiment of the present invention will be described. FIG. 15 is a diagram illustrating an example of connection between a relay communication device 5 and a plurality of SeNBs 2 according to the embodiment. An overall network configuration of an MeNB 1, the relay communication device 5, and the SeNBs 2-1 to 2-N (N=3 in the drawing) in a wireless communication system according to the embodiment is similar to the wireless communication system 100 illustrated in FIG. 1. However, a connection configuration between the relay communication device 5 and the SeNBs 2-1 to 2-N is 1-to-multiple connection using optical fiber as illustrated in FIG. 15. For this connection, a passive optical network (PON), for example, is used. Hereinafter, differences from the first embodiment will be mainly described.

FIG. 16 is a diagram illustrating an example of a system information table stored in the relay communication device 5 according to the embodiment. The relay communication device 5 according to the embodiment generates and holds the system information table illustrated in FIG. 16 instead of the system information table illustrated in FIG. 9. SeNB numbers, first system information, and second system information set in the system information table illustrated in FIG. 16 are similar to those in the system information table illustrated in FIG. 9.

The relay communication function unit 502 of the relay communication device 5 shares, with the SeNBs 2, communication information such as light wavelengths and time slot positions used at the time of communication as illustrated in FIG. 16 and makes an agreement for connection for communication in order to communicate with newly added SeNBs 2 through the optical fiber. In the system information table illustrated in FIG. 16, the communication information shared by the SeNBs 2 is set. In the embodiment, a specific method for making an agreement for connection for communication will not be designated, and an arbitrary method may be used.

In the second embodiment, the system information that the SeNBs 2 are caused to use is set by a method that is similar to that in the first embodiment. This setting procedure will be described using FIGS. 10 and 16.

The relay communication function unit 502 of the relay communication device 5 recognizes information of connection to the SeNBs 2 (Step S101). The destination control unit 503 saves the communication information such as wavelength numbers and time slot numbers in the system information table and further sets the system information that the SeNBs 2 are caused to use as illustrated in FIG. 16, for example. The destination control unit 503 sets the system information to be used such that the system information does not overlap among different SeNBs 2 (Step S102).

In a case in which the SeNB 2 with an SeNB number 3 is added as illustrated in the example in FIG. 16, for example, the destination control unit 503 sets the first system information that the SeNB 2 is to distribute to the UE 4 to 1 on the basis of a wavelength W1 used for connection to the SeNB 2. Next, the destination control unit 503 sets the second system information that the SeNB 2 is to distribute to the UE 4 to 26 on the basis of a time slot T26 used for connection to the SeNB 2. In this manner, the destination control unit 503 sets system information configured of the first system information and the second system information set so as not to overlap among the SeNBs 2 and distributes the system information to the SeNB 2 via the relay communication function unit 502 (Step S103).

Note that the procedure is not limited to that described above, and the destination control unit 503 may use a setting or managing method such that the system information does not overlap among different SeNBs 2 in the relay communication device 5 if there is such a method. Also, the method for setting the system information for the SeNB 2 using the wavelength and the time slot number has been described above. In addition to these, information such as coding types and transmission power used at the time of communication, for example, may be used if there is information with which the relay communication device 5 can uniquely identify the SeNB 2 on a wired physical line.

Method for Setting Identification Information for Wireless Access Network in SeNB 2

Because a method for setting identification information of a wireless access network in the SeNBs 2 and a series of operations through which the set identification information reaches the relay communication device 5 via the UE 4 and the MeNB 1 in the second embodiment are similar to those in the first embodiment, detailed description thereof will be omitted.

Third Embodiment

Figure 17:
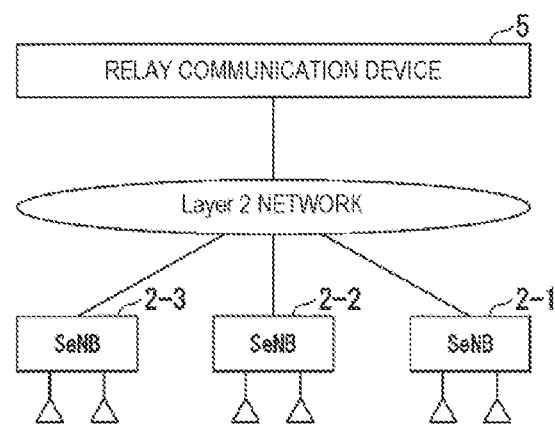
FIG. 17 is a diagram illustrating an example of connection between a relay communication device and an SeNB according to a third embodiment.

A third embodiment of the present invention will be described. FIG. 17 is a diagram illustrating an example of connection between a relay communication device 5 and a plurality of SeNBs 2 according to the embodiment. An overall network configuration of an MeNB 1, the relay communication device 5, and the SeNBs 2-1 to 2-N (N=3 in the drawing) in a wireless communication system according to the embodiment is similar to the wireless communication system 100 illustrated in FIG. 1. However, the relay communication device 5 and the SeNBs 2-1 to 2-N are connected by a layer 2 network as illustrated in FIG. 17. In other words, connection between the relay communication device 5 and the SeNBs 2-1 to 2-N is assumed to be one-to-multiple connection using a logical line based on VLAN tags. Hereinafter, differences from the first embodiment will be mainly described.

FIG. 18 is a diagram illustrating an example of system information table stored by the relay communication device 5 according to the embodiment. The relay communication device 5 according to the embodiment generates and holds the system information table illustrated in FIG. 18 instead of the system information table illustrated in FIG. 9. SeNB numbers, first system information, and second system information set in the system information table illustrated in FIG. 18 are similar to those in the system information table illustrated in FIG. 9.

The relay communication function unit 502 of the relay communication device 5 shares connection ports and communication information of VLAN tags and the like for establishing communication under the connection ports with the SeNBs 2 as illustrated in FIG. 18 and makes agreement for connection for communication in order to communicate with newly added SeNBs 2 using the logical line. In the system information table illustrated in FIG. 18, this communication information shared by the SeNBs 2 is set. In the embodiment, a specific method for making an agreement for connection for communication will not be designated, and an arbitrary method may be used.

In the third embodiment, system information that the SeNBs 2 are caused to use is set by a method that is similar to that in the first embodiment. This setting procedure will be described using FIGS. 10 and 18.

The relay communication function unit 502 of the relay communication device 5 recognizes information of connection to the SeNBs 2 (Step S101). The destination control unit 503 saves communication information such as connection port numbers and VLAN tag numbers in the system information table and further sets the system information that the SeNBs 2 are caused to use as illustrated in FIG. 18, for example. The destination control unit 503 sets the system information to be used such that the system information does not overlap among different SeNBs 2 (Step S102).

In a case in which an SeNB 2 with an SeNB number 3 is added as illustrated in the example in FIG. 18, for example, the destination control unit 503 sets the first system information that the SeNB 2 is to distribute to the UE 4 to 2 on the basis of a port P2 used for connection to the SeNB 2. Next, the destination control unit 503 sets the second system information that the SeNB 2 is to distribute to the UE 4 to 10 on the basis of a VLAN tag 10 used for connection to the SeNB 2. In this manner, the destination control unit 503 sets the system information configured of the first system information and the second system information set so as not to overlap among the SeNBs 2 and distributes the system information to the SeNB 2 via the relay communication function unit 502 (Step S103).

Note that the procedure is not limited to that described above, and the relay communication device 5 may use a setting or managing method such that the system information does not overlap among different SeNBs 2 if there is such a method. In addition, the method for setting the system information in the SeNBs 2 using connection port numbers and VLAN tag numbers has been described above. In addition to this, if there is information with which the relay communication device 5 and the SeNBs 2 can uniquely be identified on the logical line, such identifier information may be used.

Method for Setting Identification Information for Wireless Access Network in SeNB 2

Because a method for setting identification information of a wireless access network in the SeNBs 2 and a series of operations through which the set identification information reaches the relay communication device 5 via the UE 4 and the MeNB 1 in the third embodiment are similar to those in the first embodiment, detailed description thereof will be omitted.

Fourth Embodiment

A fourth embodiment of the present invention will be described. Hereinafter, differences between the fourth embodiment and the first to third embodiments will be described.

Method for Setting Identification Information for Wireless Access Network in SeNB 2

The embodiment explains a method in which an SeNB 2 generates a CSG-ID on the basis of system information received from the relay communication device 5. A CSG-ID is 28-bit identification information, is described in SYSTEMINFORMATIONBLOCKTYPE1 in the RRC layer, and can be transmitted by the SeNB 2 to the UE 4 in the coverage.

For example, the first system information that the SeNB 2 with the SeNB number 1 is to distribute to the UE 4 is 0, and the second system information is 11, in the system information illustrated in FIG. 9. In this case, it is possible to perform allocation by setting the first digit starting from the left of generated a CSG-ID to 0 and setting the second and third digits to 11. In this manner, the system information recording unit 203 of the SeNB 2 generates a CSG-ID that is different from those of the other SeNBs 2, and the wireless access communication function unit 202 wirelessly transmits CSG-ID to the UE 4.

Description of Operation in Which UE 4 Reports Information Regarding Wireless Access Network of SeNB 2 to MeNB 1

The UE 4 sets a result of measuring quality of wireless access communication with the SeNBs 2 including received signal power in a PHY layer and a CSG-ID described in SYSTEMINFORMATIONBLOCKTYPE1 in the RRC layer in MeasResults of a MeasurementReportMessage in the RRC layer and transmits the result of measurement to the MeNB 1. In this manner, the UE 4 reports the information regarding quality of the wireless access communication with the SeNBs 2 to the MeNB 1.

Description of Operation in Which Relay Communication Device 5 Reports Wireless Resource of Wireless Access Network to MeNB 1

The relay communication device 5 establishes connection to a new SeNB 2, then transmits the first system information and the second system information to the target SeNB 2 as in Step S103 described above, and then provides a report that a resource of a wireless access network is to be added to the MeNB 1. As an example of this reporting method, the report is provided to the MeNB 1 using an X2 SETUP REQUEST Message by the method described in Citation Literature 3, pp. 27, 64, 107-109, for example. In other words, the transfer path control unit 504 of the relay communication device 5 sets the PLMN-ID and the CSG-ID related to the added SeNB 2 in the X2 SETUP REQUEST Message and transmits the X2 SETUP REQUEST Message to the MeNB 1. The PLMN-ID is set in IE of Global eNB ID.

The MeNB 1 can recognize that the resource of the wireless access network has been added due to the connection to the new SeNB 2 on the basis of such a report from the relay communication device 5. Even though a plurality of relay communication devices 5 are connected at the same time, the MeNB 1 can determine which wireless resource is present in each relay communication device 5.

Note that in a case in which an SeNB 2 has been removed from subordinate SeNBs 2 of the relay communication device 5, the relay communication device 5 is capable of deleting the target SeNB 2 and the system information allocated to the SeNB 2 form the management table illustrated in FIG. 9 and notifying the MeNB 1 of the change in wireless resource as described in Citation Literature 3, pp. 30-31, 66-69.

Description of Method for Communication between MeNB 1 and Relay Communication Device 5

The MeNB 1 illustrated in FIG. 1 receives the information regarding quality of wireless access communication with the SeNBs 2-1 to 2-N from the UE 4 and then selects an SeNB 2 to perform DC in accordance with the information of the wireless resource in the wireless access network received from the relay communication device 5 and the amount of user data necessary to be transmitted to the UE 4. The MeNB 1 secures the wireless resource of the selected SeNB 2 via the relay communication device 5.

In order to secure the wireless resource of the SeNB 2, the MeNB 1 describes CSG-ID of the SeNB 2 that is a target of DC as IE of Spare of SCG-ConfigInfo in the SeNB Addition Request Message transmitted in Step S302 in FIG. 12 and transmits the SeNB Addition Request Message to the relay communication device 5. The relay communication device 5 transfers a control signal necessary for the subordinate SeNB 2 on the basis of such CSG-ID.

In a case in which a permission notification of the SeNB Addition Request Acknowledgement Message is received from the SeNB 2 that is a DC target in Step S304 in FIG. 12, the transfer path control unit 504 of the relay communication device 5 holds information of the corresponding E-RAB number and CSG-ID. Thereafter, the transfer path control unit 504 of the relay communication device 5 transfers the Addition Request Acknowledgement Message to the MeNB 1.

Next, the MeNB 1 transfers the user data to the relay communication device 5. The MeNB 1 describes the E-RAB number in the user data at this time. Thus, the transfer path control unit 504 of the relay communication device 5 specifies the SeNB 2 that is the DC target from a linking relationship between the E-RAB number and the CSG-ID of the subordinate SeNB 2 and transfers the user data.

According to the embodiment, there is an advantage that it is possible to transfer a control signal necessary for the MeNB 1 and the SeNB 2 to perform downlink carrier aggregation for the UE 4 and a user traffic via the relay communication device without connection and link retention in the IP layer between the MeNB 1 and a plurality of SeNBs 2. As a specific method, the relay communication device 5 extracts information of a message and a header originally included in the control signal of a mobile communication system or the user traffic and provides a path control method at the time of transferring to a plurality of SeNBs 2.

According to the aforementioned embodiment, the wireless communication system includes a master base station that performs wireless communication with a terminal, one or more secondary base stations capable of performing wireless communication with the terminal, and a relay communication device that relays communication between the master base station and the secondary base station. The relay communication device and the secondary base stations are connected wirelessly or via an optical fiber or a logical line, for example.

The relay communication device includes a destination control unit and a transfer path control unit. The destination control unit notifies the secondary base station of system information used to generate first identification information for specifying wireless access networks that the secondary base stations use for wireless communication with the terminal. The destination control unit generates the system information of the secondary base station on the basis of the information used for communication between the relay communication device and the secondary base stations, for example. The transfer path control unit notifies the master base station of second identification information for specifying wireless resources, utilization of which is permitted by the secondary base stations. Also, the transfer path control unit transfers a signal received from the master base station to the secondary base stations in accordance with the first identification information or the second identification information set in the signal. At this time, the transfer path control unit may compare the first identification information set in the signal received from the master base station with the first identification information generated using the system information, and in a case in which they are matched, the transfer path control unit may transfer the signal to the secondary base station in accordance with the first identification information.

Each secondary base station includes a first identification information generation unit, a second identification information notification processing, and a wireless access communication function unit. The first identification information generation unit generates the first identification information on the basis of system information provided in the notification from the relay communication device. The first identification information generation unit is, for example, the system information recording unit 203. The second identification information notification unit notifies the master base station of the second identification information of the wireless resource, utilization of which is permitted, via the relay communication device. The second identification information notification unit is, for example, the wireless access communication function unit 202. The wireless access communication function unit wirelessly transmits, to the terminal, a signal in which the first identification information is set and the signal transferred from the relay communication device and directed to the terminal. The terminal wirelessly receives the signal in which the first identification information is set from each of the secondary base stations and wirelessly transmits the first identification information and information indicating a result of measuring quality of wireless connection to the secondary base station in the first identification information to the master base station.

The transmission unit of the master base station selects a secondary base station to communicate with the terminal among the secondary base stations in the first identification information received from the terminal. The transmission unit sets the first identification information of the secondary base station in a signal directed to the selected secondary base station and transmits the signal to the relay communication device. Also, the transmission unit sets the second identification information of the selected secondary base station in the signal directed to the terminal and transmits the signal to the relay communication device.

As the first identification information, it is possible to use a Physical Cell ID or a CSG-ID and a PLMN-ID, for example. Note that because a Primary synchronization signal and a Secondary synchronization signal generated from the system information can be converted into a Physical Cell ID, the Primary synchronization signal and the Secondary synchronization signal can also be regarded as the first identification information. As the second identification information, an E-RAB ID can be used, for example.

Note that all or some of the functions of the MeNB 1, the SeNBs 2, 2a, and 2b, and the relay communication devices 5, 5a, and 5b may be implemented using hardware, such as an application specific integrated circuit (ASIC), a programmable logic device (PLD), or a field programmable gate array (FPGA). The MeNB 1, the SeNBs 2, 2a, and 2b, and the relay communication devices 5, 5a, and 5b include central processing units (CPU), memories, auxiliary storage devices, and the like connected via buses and function as devices provided with the aforementioned functions by executing a program. The program may be recorded in a computer-readable recording medium. The computer-readable recording medium is, for example, a portable medium such as a flexible disk, a magneto-optical disk, a ROM or a CD-ROM, or a storage device such as a hard disk drive built into a computer system. The program may be transmitted over an electrical communication line.

The embodiments of the present invention have been described above in detail with reference to the drawings. However, specific configurations are not limited to those embodiments, and include any design or the like within the scope not departing from the gist of the present invention.

REFERENCE SIGNS LIST

1 MeNB
2-1 to 2-3, 2, 2a, 2b SeNB
3-1 Link
4 UE
5, 5a, 5b Relay communication device
6-1 to 6-3 Link
100 Wireless communication system
201 Relay communication function unit
202 Wireless access communication function unit
203 System information recording unit
501 X2-IF communication function unit
502 Relay communication function unit
503 Destination control unit
504 Transfer path control unit
505 Signal separation unit

The invention claimed is:
1. A wireless communication system comprising:
a master base station;
one or more secondary base stations; and
a relay communication device configured to relay communication between the master base station and the secondary base stations,
wherein the relay communication device includes
a destination control unit configured to notify the secondary base stations of system information, and a transfer path control unit configured to perform processing of notifying the master base station of second identification information, and processing of transferring a signal received from the master base station to one of the secondary base stations in accordance with first identification information or the second identification information set in the signal, where the first identification information specifies wireless access networks that the secondary base stations use for wireless communication with a terminal and the second identification information specifies wireless resources utilization of which is permitted by the secondary base stations, each of the secondary base stations includes a first identification information generation unit configured to generate the first identification information on the basis of the system information provided in the notification from the relay communication device, a second identification information notification unit configured to notify the master base station of the second identification information of the wireless resources, the utilization of which is permitted, via the relay communication device, and a wireless access communication function unit configured to wirelessly transmit, to the terminal, a signal in which the first identification information is set and the signal transferred from the relay communication device and directed to the terminal, and the master base station includes a transmission unit configured to select one of the secondary base stations to communicate with the terminal among the secondary base stations in the first identification information wirelessly received from the terminal, set the first identification information of the selected secondary base station in the signal directed to the secondary base station, transmit the signal to the relay communication device, set the second identification information of the selected secondary base station in the signal directed to the terminal, and transmit the signal to the relay communication device;

wherein the transfer path control unit compares the first identification information set in the signal received from the master base station with the first identification information generated using the system information, and in a case in which the first identification information set in the signal received from the master base station matches with the first identification information generated using the system information, the transfer path control unit transfers the signal to the secondary base station in accordance with the first identification information.

2. The wireless communication system according to claim 1, wherein the destination control unit generates the system information of the secondary base stations on the basis of information used for communication between the relay communication device and the secondary base stations.

3. The wireless communication system according to claim 1, wherein the relay communication device and the secondary base stations are connected wirelessly or via an optical fiber or a logical line.

4. The wireless communication system according to claim 1, wherein the master base station receives information of quality of wireless connection to the secondary base stations specified by the first identification information from the terminal.

5. The wireless communication system according to claim 1, wherein the first identification information includes information of service providers of the secondary base stations.

6. A communication control method in a wireless communication system that includes a master base station, one or more secondary base stations, and a relay communication device configured to relay communication between the master base station and the secondary base stations, the method comprising:

causing the relay communication device to
notify the secondary base stations of system information, where the system information is generated on the basis of information used for communication between the relay communication device and the secondary base stations;

causing the secondary base stations to
generate the first identification information on the basis of the system information provided in the notification from the relay communication device, where the first identification information specifies wireless access networks that the secondary base stations use for wireless communication with a terminal,
wirelessly transmit a signal in which the first identification information is set to the terminal, and
notify the master base station of second identification information via the relay communication device, where the second identification information specifies wireless resources utilization of which is permitted by the secondary base stations;

causing the master base station to
select one of the secondary base stations to communicate with the terminal among the secondary base stations in the first identification information wirelessly received from the terminal, set the first identification information of the selected secondary base station in the signal directed to the secondary base station, transmit the signal to the relay communication device, set the second identification information of the selected secondary base station in the signal directed to the terminal, and transmit the signal to the relay communication device;

causing the relay communication device to
transfer the signal received from the master base station to the secondary base station in accordance with the first identification or the second identification set in the signal; and causing the secondary base station to
wirelessly transmit, to the terminal, the signal transferred from the relay communication device and directed to the terminal.

7. A wireless communication system comprising:
a master base station;
one or more secondary base stations; and
a relay communication device configured to relay communication between the master base station and the secondary base stations,
wherein the relay communication device includes
a destination control unit configured to notify the secondary base stations of system information, and
a transfer path control unit configured to perform processing of notifying the master base station of second identification information, and processing of transferring a signal received from the master base station to one of the secondary base stations in accordance with first identification information or the second identification information set in the signal, where the first identification information specifies wireless access networks that the secondary base stations use for wireless communication with a terminal and the second identification information specifies wireless resources utilization of which is permitted by the secondary base stations, each of the secondary base stations includes a first identification information generation unit configured to generate the first identification information on the basis of the system information provided in the notification from the relay communication device, a second identification information notification unit configured to notify the master base station of the second identification information of the wireless resources, the utilization of which is permitted, via the relay communication device, and a wireless access communication function unit configured to wirelessly transmit, to the terminal, a signal in which the first identification information is set and the signal transferred from the relay communication device and directed to the terminal, and the master base station includes a transmission unit configured to select one of the secondary base stations to communicate with the terminal among the secondary base stations in the first identification information wirelessly received from the terminal, set the first identification information of the selected secondary base station in the signal directed to the secondary base station, transmit the signal to the relay communication device, set the second identification information of the selected secondary base station in the signal directed to the terminal, and transmit the signal to the relay communication device, wherein the destination control unit generates the system information of the secondary base stations on the basis of information used for communication between the relay communication device and the secondary base stations.

8. The wireless communication system according to claim 7, wherein the relay communication device and the secondary base stations are connected wirelessly or via an optical fiber or a logical line.

9. The wireless communication system according to claim 7, wherein the master base station receives information of quality of wireless connection to the secondary base stations specified by the first identification information from the terminal.

10. The wireless communication system according to claim 7, wherein the first identification information includes information of service providers of the secondary base stations.

* * * * *